United States Patent
Kim et al.

[19]

[11] Patent Number: 6,029,922
[45] Date of Patent: Feb. 29, 2000

[54] RETAINER ELEMENT FOR A SECURING ELEMENT USED TO MAINTAIN A CRANK HANDLE ON A FISHING REEL

[75] Inventors: Hyunkyu Kim, Broken Arrow; Robert Leon Carpenter, Tulsa, both of Okla.

[73] Assignee: Brunswick Corporation, Lake Forest, Ill.

[21] Appl. No.: 09/207,853

[22] Filed: Dec. 8, 1998

[51] Int. Cl.$^7$ ................................................ A01K 89/00
[52] U.S. Cl. ................... 242/283; 242/319; 24/113 MP; 74/545; 403/326; 411/431
[58] Field of Search .................. 242/282, 283, 242/284, 311, 312, 319; 403/326, 329; 74/545; 24/113 MP; 411/431, 373, 121, 120

[56] References Cited

U.S. PATENT DOCUMENTS

| | | | |
|---|---|---|---|
| 718,744 | 1/1903 | White | 411/120 |
| 4,557,654 | 12/1985 | Masuda et al. | 411/373 X |
| 4,898,493 | 2/1990 | Blankenburg | 403/326 |
| 5,292,087 | 3/1994 | Sato | 242/283 X |
| 5,372,324 | 12/1994 | Sato | 242/312 |
| 5,690,290 | 11/1997 | Asano et al. | 242/283 |
| 5,816,733 | 10/1998 | Ishikawa et al. | 403/326 X |

FOREIGN PATENT DOCUMENTS

| | | | |
|---|---|---|---|
| 937807 | 6/1982 | U.S.S.R. | 411/373 |

*Primary Examiner*—Donald P. Walsh
*Assistant Examiner*—Emmanuel M. Marcelo
*Attorney, Agent, or Firm*—Wood, Phillips, VanSanten, Clark & Mortimer

[57] ABSTRACT

A crank assembly for a fishing reel. The crank assembly has a first element that is capable of being driven in rotation to effect operation of a fishing reel, a crank handle for imparting a rotational drive force to the first element, a securing element that is repositionable relative to the crank handle and first element between a first position and a second position, and a retainer element that is capable of being press fit into and maintained in an operative position relative to the crank handle and first element wherein the retainer element prevents the securing element from moving from the second position into the first position. The crank handle is mountable to and separable from the first element with the securing element in the first position. The securing element maintains the crank handle mounted to the first element with the securing element in the second position.

23 Claims, 4 Drawing Sheets

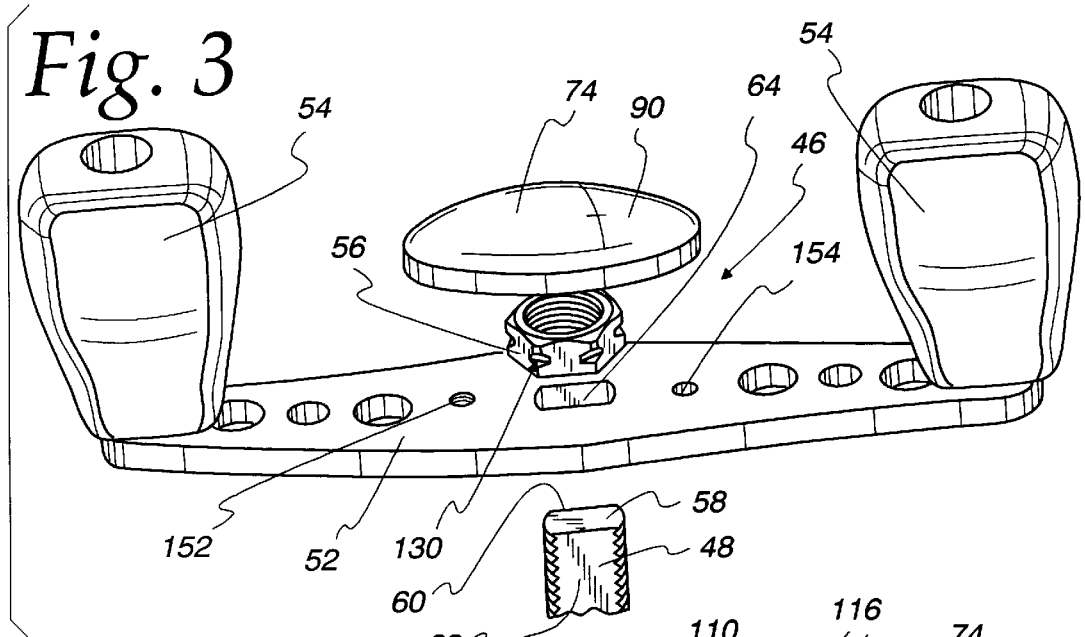
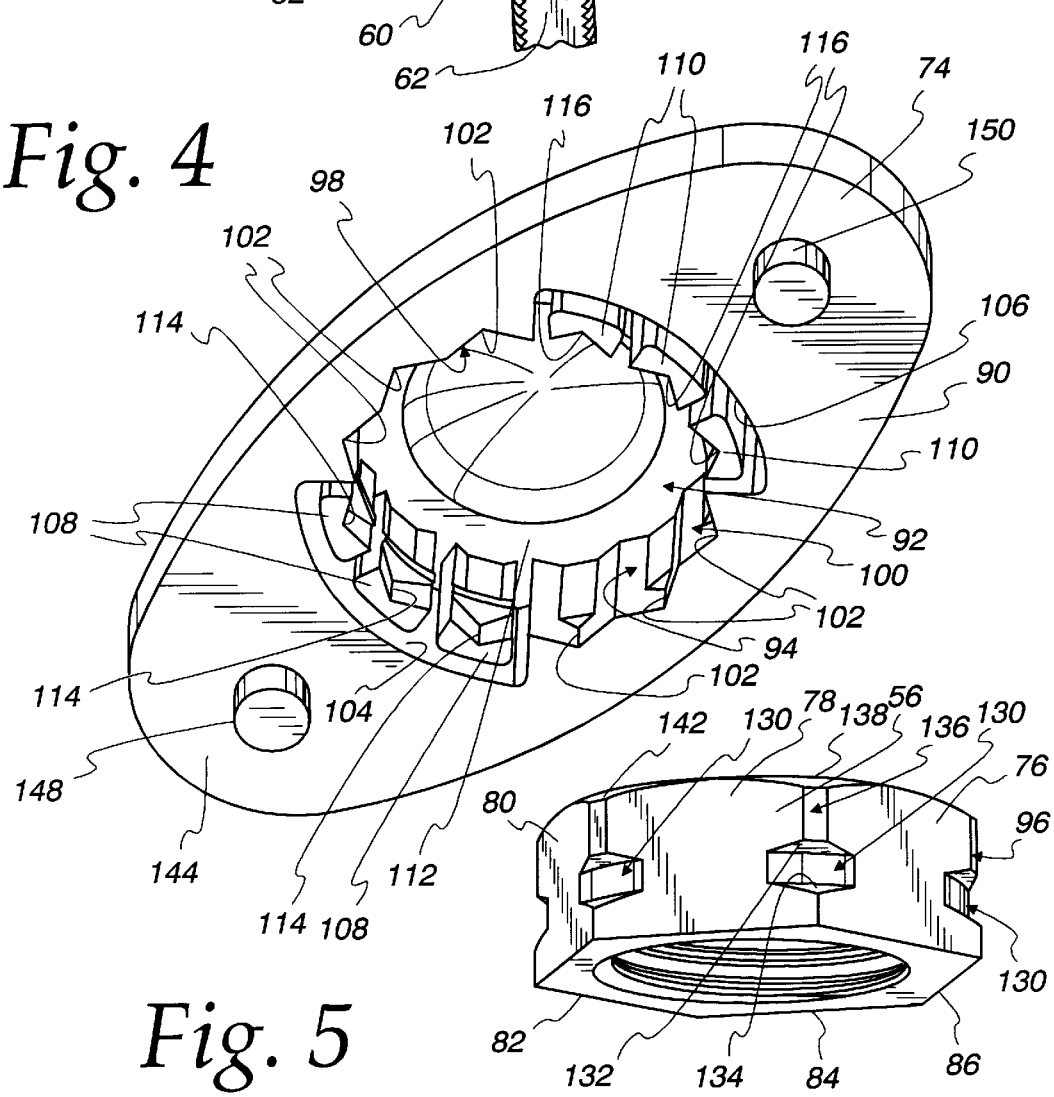

RETAINER ELEMENT FOR A SECURING ELEMENT USED TO MAINTAIN A CRANK HANDLE ON A FISHING REEL

BACKGROUND OF THE INVENTION

1. Field of the Invention

This invention relates to rotatable elements such as those used to operate fishing reels through a crank handle and, more particularly, to a retainer element which prevents a securing element for the crank handle from repositioning as might allow inadvertent separation of the crank handle from the rotatable element.

2 Background Art

In a well known fishing reel construction, a line carrying spool is driven, either directly or indirectly, through a rotatable shaft that protrudes to externally of the fishing reel frame, to retrieve and/or pay out line. A protruding shaft portion is threaded and configured to key within an opening in a crank handle. A nut is fit on the threaded shaft portion and tightened to captively maintain the crank handle upon the shaft in keyed relationship therewith. During operation of the reel, there is a tendency of the nut to loosen, thereby requiring the user to re-tighten the nut or risk losing the nut and releasing the crank handle.

To avoid this problem, retainer elements have been devised which are fit over the free shaft end to make a keyed connection with a nut tightened thereon. A screw is directed through the retainer element and into the crank handle to prevent the retainer element from rotating around the shaft axis relative to the crank handle. An undercut is normally formed in a bore through the retainer element to allow the screw head to be flush with or below the external surface of the retainer element, for purposes of aesthetics and to avoid exposure of the screw head to the user.

Designers of fishing reels generally strive to minimize the number of assembly steps to minimize manufacturing time and costs. In assembly lines, the installation of the screw through the retainer element and into the crank handle requires a separate step.

While functionality is a prime consideration, aesthetics is also a consideration in the design of fishing reels. The head of the screw which holds the retainer element in place is exposed to view. Thus, the head is ideally designed to coordinate color- and style-wise with the appearance of the remainder of the reel.

SUMMARY OF THE INVENTION

One aspect of the invention is a crank assembly for a fishing reel. The crank assembly has a first element that is capable of being driven in rotation to effect operation of a fishing reel, a crank handle for imparting a rotational drive force to the first element, a securing element that is repositionable relative to the crank handle and first element between a first position and a second position, and a retainer element that is capable of being press fit into and maintained in an operative position relative to the crank handle and first element wherein the retainer element prevents the securing element form moving from the second position into the first position. The crank handle is mountable to and separable from the first element with the securing element in the first position. The securing element maintains the crank handle mounted to the first element with the securing element in the second position.

In one form, the securing element is a nut that is threadably connected to the first element and rotatable around a first axis relative to the first element between the first and second positions.

In one form, the securing element is rotatable around a first axis and the securing element has a first shoulder facing in a first axial direction relative to the first axis. The retainer element has a first repositionable finger with a second shoulder facing oppositely to the first axial direction. The repositionable finger abuts to the securing element as the retainer element is moved generally parallel to the first axis from a pre-assembly position into the operative position. Surfaces on the first repositionable finger and securing element cooperate to deflect the first repositionable finger radially relative to the first axis from a first state to a deflected state to allow the second shoulder to move axially up to and past the first shoulder as the retainer element moves from the pre-assembly position into the operative position, whereupon the first repositionable finger moves back towards the first state so that the first and second shoulders face each other and interact to prevent the retainer element from moving from the operative position into the pre-assembly position.

In one form, the retainer element has a first cantilevered post extending generally parallel to the first axis and extending into the crank handle to prevent the retainer element from rotating relative to the crank handle around the first axis with the retainer element in the operative position. The crank handle may have a threaded bore, with the first cantilevered post capable of being extended into the threaded bore by translating the retainer element generally parallel to the first axis.

The first cantilevered post and finger may be formed together as one piece.

In one form, the retainer element has a second cantilevered post extending generally parallel to the first axis and extending into the crank handle to prevent the retainer element from rotating relative to the crank handle around the first axis with the retainer element in the operative position.

The securing element may have a third shoulder facing in the first axial direction with the retainer element having a second repositionable finger with a fourth shoulder facing oppositely to the first axial direction. The second repositionable finger cooperates with the securing element in the same manner as the first repositionable finger cooperates with the securing element as the retainer element is moved from the pre-assembly position into the operative position so that the third and fourth shoulders face each other and interact to prevent the retainer element from moving from the operative position into the pre-assembly position.

The nut may have a radially extending notch formed therein which defines the first shoulder.

The first and third shoulders may be diametrically opposite relative to the first axis.

The retainer element may be a molded plastic piece.

The first element may be an elongate shaft that is rotatable to impart rotation to a line carrying spool on a fishing reel.

The crank handle may have a crank knob which is graspable by a user to facilitate rotation of the crank handle.

In one form, the retainer element in the operative position is keyed to both the securing element and the crank handle.

The invention is also directed to a fishing reel having a frame, an operating mechanism on the frame, with the operating mechanism including a shaft that is rotatable around a first axis, a crank handle for imparting rotation to the shaft, a nut that is threadably engaged with the shaft and repositionable between first and second positions relative to the crank handle and shaft, and a retainer element that is press fit into and maintained in an operative position relative to the crank handle and shaft, wherein the retainer element prevents the nut from moving from the second position into the first position. The crank handle is mountable to and separable from the shaft with the nut in the first position. The nut maintains the crank handle mounted to the shaft with the nut in the second position.

The invention is also directed to a crank assembly for a fishing reel having a first element that is capable of being driven in rotation to effect operation of a fishing reel, a crank handle for imparting a rotational drive force to the first element, a securing element that is repositionable relative to the crank handle and first element between a first position and a second position, and a retainer element that is capable of being placed and maintained in an operative position relative to the crank handle and first element without the use of a separate fastener element, wherein the retainer element prevents the securing element from moving from the second position into the first position. The crank handle is mountable to and separable from the first element with the securing element in the first position. The securing element maintains the crank handle mounted to the first element with the securing element in the second position.

BRIEF DESCRIPTION OF THE DRAWINGS

FIG. 3 is an enlarged, exploded, perspective view of the crank assembly on the fishing reel in FIG. 2;

FIG. 4 is an enlarged, perspective view of the inventive retainer element;

FIG. 5 is an enlarged, perspective view of the securing element/nut used to maintain the crank handle in place and make snap fit connection with the retainer element;

DETAILED DESCRIPTION OF THE DRAWINGS

Figures 1, 2:
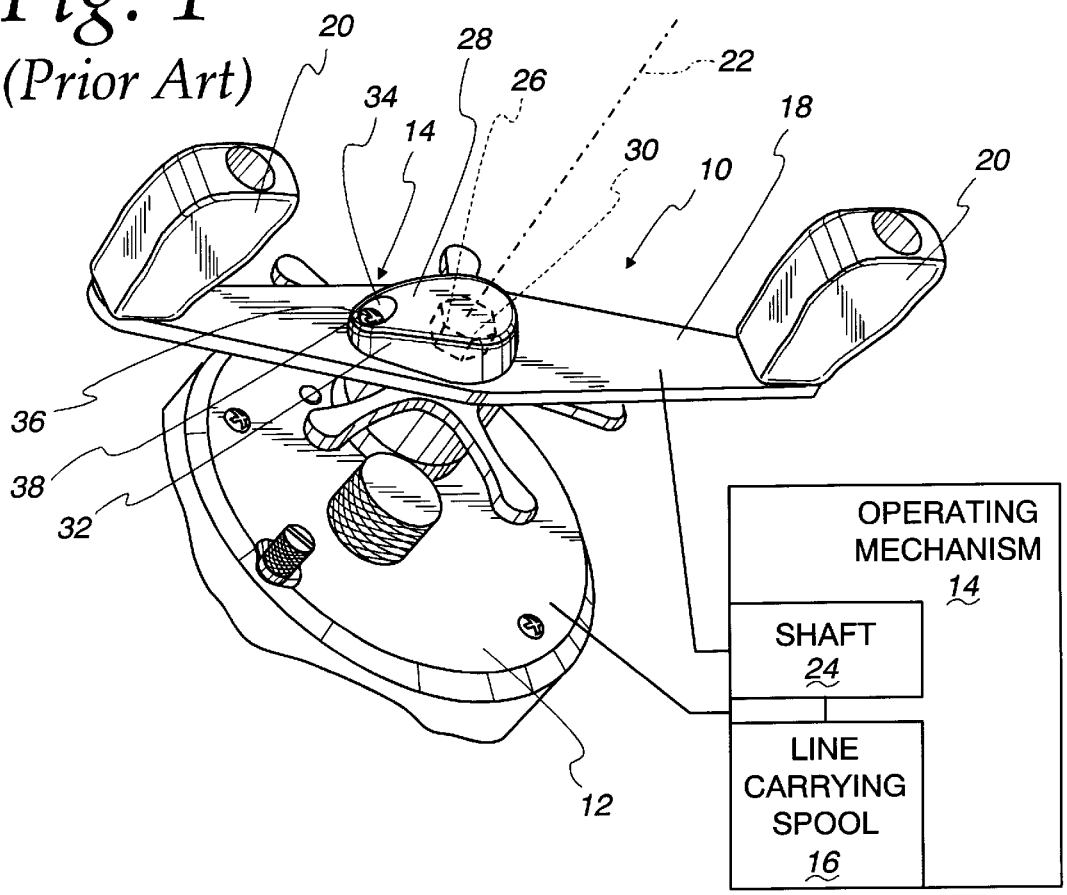
FIG. 1 is a fragmentary, perspective view of a fishing reel showing a conventional retainer element mounted to a crank handle to prevent a nut, which holds the crank handle in place, from loosening.
FIG. 2 is a partially schematic, perspective view of a fishing reel with a retainer element, according to the present invention, in an operative position so as to prevent a securing element/nut, which maintains a crank handle in place, from loosening.

In FIG. 1, a prior art fishing reel is shown at 10. The fishing reel 10 consists of a frame 12 on which an operating mechanism 14 is mounted. The operating mechanism 14 includes a line carrying spool 16, which is driven in rotation through an external crank handle 18, that is rotatable by a user through crank knobs 20 around an axis 22. The crank handle 18 is keyed to a shaft 24 which drives the line carrying spool 16 through a drive gear arrangement (not shown). The crank handle 18 slides axially over the shaft 24 and is maintained thereon by a nut 26 which is threadably attached to the free end of the shaft 24.

A retainer element 28 has a cavity 30 formed therein which receives the nut 26 and makes keyed connection therewith so that the retainer element 28 and nut 26 are limited in rotation relative to each other around the axis 22.

The retainer element 28 has a radially elongated portion 32 with a stepped bore 34 therethrough. A screw 36 is directed into the bore 34 and into a threaded bore (not shown) in the crank handle 18 to prevent the retainer element 28 from rotating relative to the crank handle 18 around the axis 22. Resultingly, the retainer element 28 is keyed to the nut 26 and to the crank handle 18 so that the nut 26 is limited in rotation, or prohibited from rotating, relative to the shaft 24 as might result in inadvertent loosening of the nut 26, which could loosen or altogether release the crank handle 18 from the shaft 24.

The head 38 of the screw 36 remains exposed at the bore 34. As mentioned above, for aesthetic purposes, the exposed head 38 is desirably coordinated into the overall appearance of the fishing reel 10.

As further discussed above, the assembly of the retainer element 28 involves initial placement thereof into keyed connection with the nut 26, after which the screw 36 must be installed. The screw 36 itself could conceivably loosen and separate, as a consequence of which the retainer element 28 could in turn separate, which thereby exposes the end of the shaft 24 with the nut 26 thereon. The nut 26 thus becomes prone to loosening as the reel 10 is operated.

The inventive structure is shown in FIGS. 2–9. A fishing reel, of the type shown at 40, is but exemplary of the many different fishing reels into which the present invention can be incorporated. The reel 40 functions similarly to the reel 10, shown in FIG. 1 and described hereinabove. The fishing reel 40 consists of a frame 42 to which an operating mechanism 44 is mounted. The operating mechanism 44 includes a crank assembly at 46. The crank assembly 46 includes a first element/shaft 48 which is driven in rotation around an axis 50 through a crank handle 52 having crank knobs 54 thereon, offset radially from the axis 50, that can be gripped and manipulated by a user. The crank assembly 46 further includes a securing element/nut 56, which is threadably engaged to the free end 58 of the shaft 48 to maintain the crank handle 52 in a captive position on the shaft 48. The shaft 48 has diametrically opposite flats 60, 62 which make keyed connection within a complementarily-shaped bore 64 through the crank handle 52 to prevent relative rotation between the crank handle 52 and the shaft 48 around the axis 50.

Figure 9:
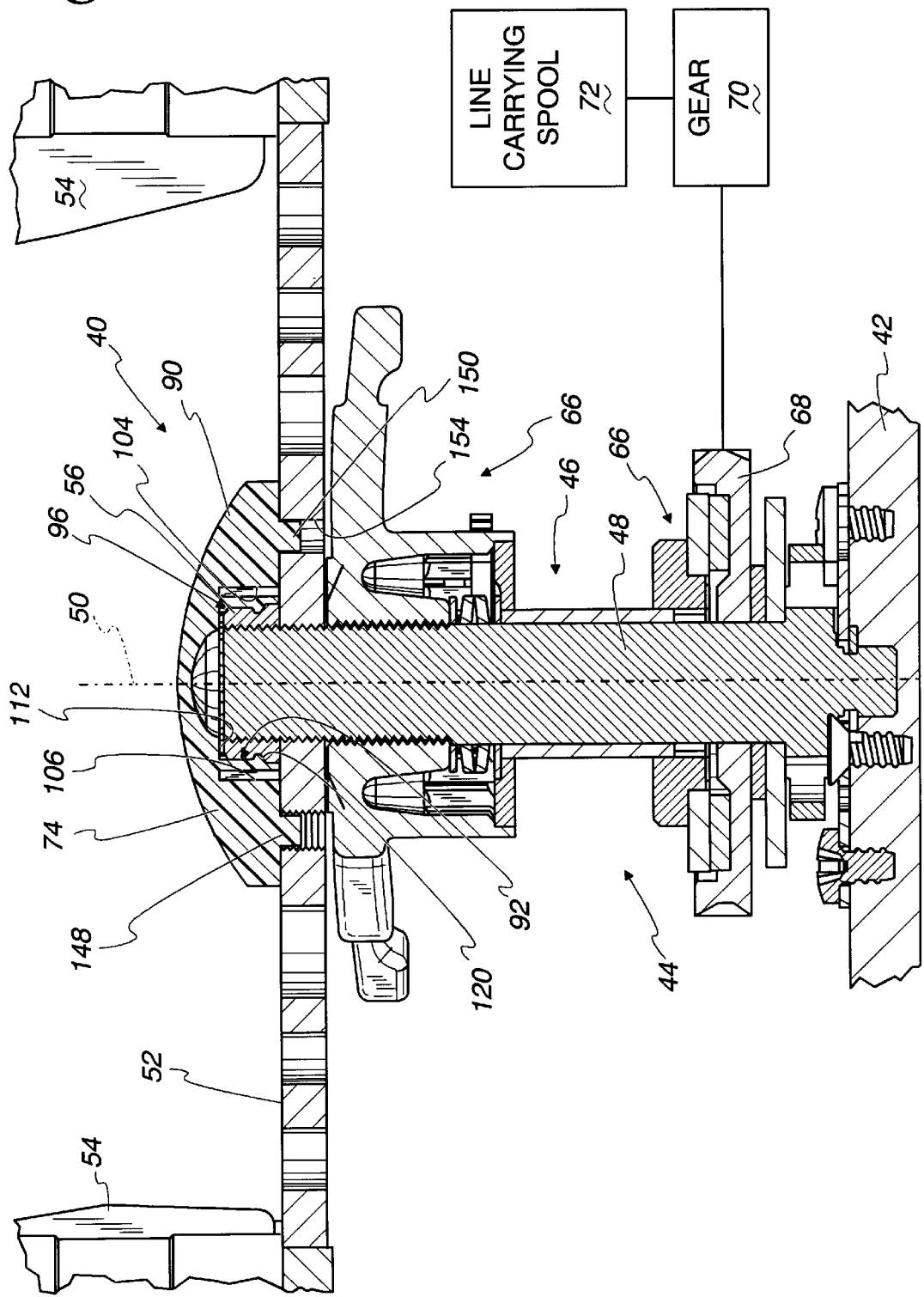
FIG. 9 is an enlarged, partially schematic, cross-sectional view of the fishing reel of FIG. 2 incorporating the inventive crank assembly.

Through a drag system, as shown at 66 in FIG. 9, rotation of the shaft 48 is frictionally transmitted to a drive gear 68 and in turn to a driven gear 70 which is rotatable with a line carrying spool 72. Details of the drag system 66 and the transmission between the shaft 48 and line carrying spool 72 are described in copending U.S. application Ser. No. 08/851, 119, entitled "Anti-Reverse Drag Mechanism", the disclosure of which is incorporated herein by reference.

It should be understood that the invention can be incorporated into virtually any type of fishing reel which uses either no drag or a drag system that is different from that shown in FIG. 9. The invention is intended to be associated with an element that is rotated to effect operation of some mechanism on the fishing reel, in this case rotation of the line carrying spool 72.

According to the invention, a retainer element 74, which is part of the crank assembly 46, is attached to the crank handle 52 in such a manner that the retainer element 74 is keyed to the nut 56 and to the crank handle 52 so that the nut 56 does not rotate, or is limited in rotation, relative to the retainer element 74 and the retainer element 74 in turn does not rotate, or is limited in rotation, relative to the crank handle 52 around the shaft axis 50.

Figure 6:
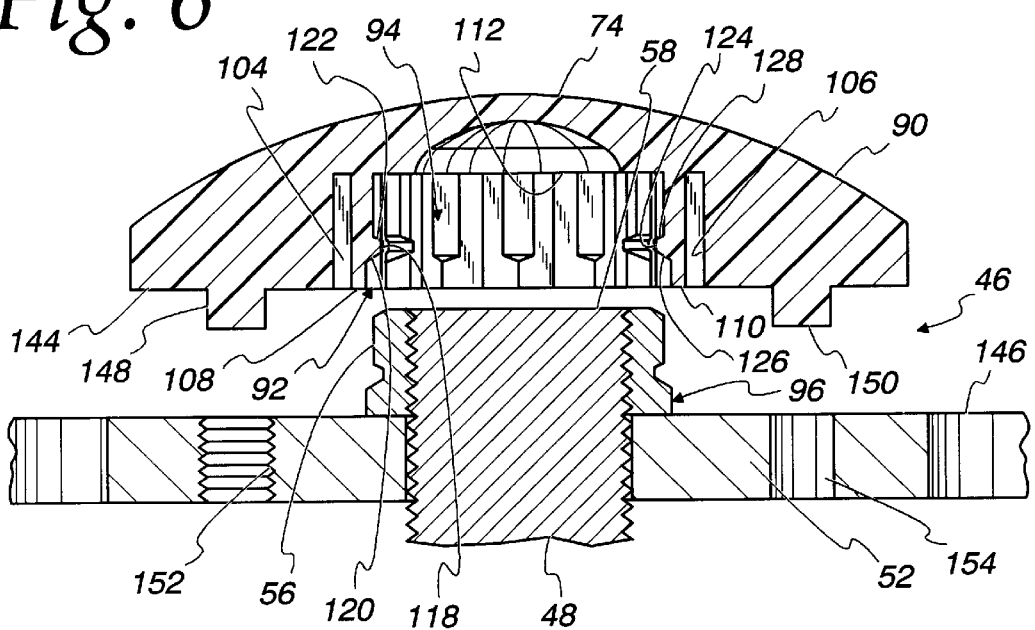
FIG. 6 is a cross-sectional view of the inventive crank assembly with the retainer element in a pre-assembly position.
Figure 7:
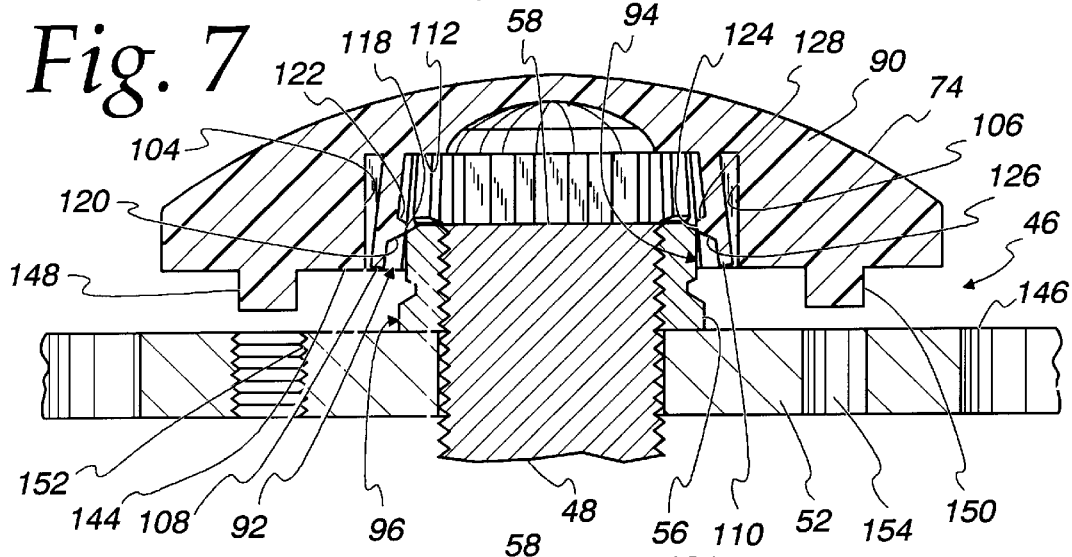
FIG. 7 is a view as in FIG. 6 with the retainer element being moved from the pre-assembly position towards an operative position.
Figure 8:
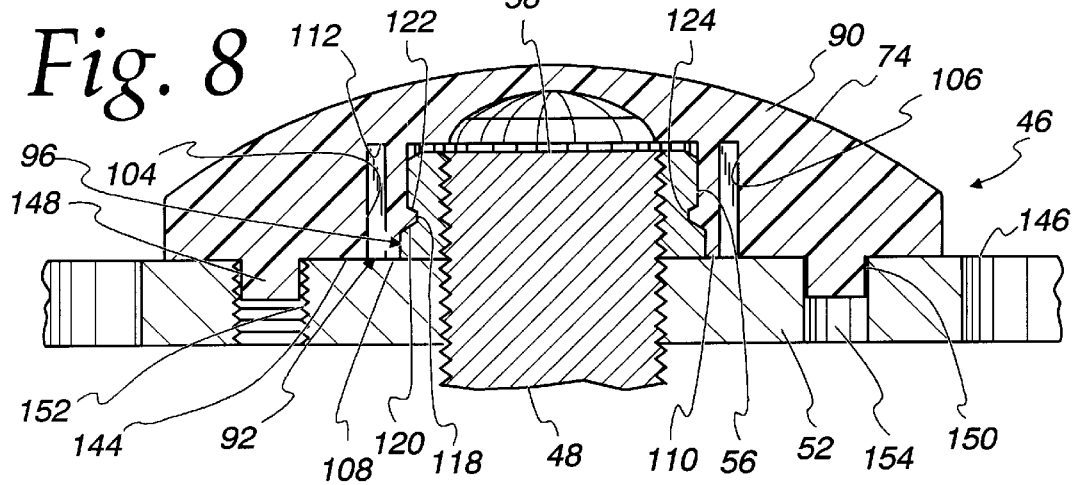
FIG. 8 is a view as in FIGS. 6 and 7 with the retainer element in the operative position.

According to the invention, the retainer element 74 is movable from a pre-assembly position, a shown in FIG. 6, into an operative position, shown in FIG. 8, by simply advancing the retainer element 74 in an axial line towards and against the crank handle 52 and nut 56.

In the embodiment shown, the nut 56 has a conventional hexagonal circumferential shape defined by six flat sides 76, 78, 80, 82, 84, 86. Of course other, than a hexagonal shape is contemplated in which event obvious modifications can be made from the structure disclosed herein. The nut 56 can be engaged by a conventional wrench to be tightened to a predetermined torque as is optimal for a particular reel construction. The nut 56 is changeable from a first position, as shown in FIG. 3, wherein the crank handle 52 can be mounted to and separated from the shaft 48, and a second position, as shown in FIGS. 6–9, wherein the nut 56 maintains the crank handle 52 mounted to the shaft 48.

The retainer element has a body 90 with a generally elliptical outline as viewed along the axis 50. The body 90 has a cavity 92 which accepts preferably the entirety of the nut 56. The cavity 92 is bounded by a surface 94 which makes keyed connection with the circumferential surface 96 of the nut 56 defined cooperatively by the flat sides 76–86.

The surface 94 is defined by two fixed, diametrically opposite surface portions 98, 100 (FIG. 4) with circumferentially spaced, V-shaped notches 102 configured to key to corners defined at the juncture of adjacent sides 76–86.

The cavity 92 has diametrically oppositely extending sub-cavities 104, 106 within which radially deflectable fingers 108, 110, respectively, reside. The fingers 108, 110 project in cantilevered fashion from an axially facing base wall 112 from the body 90 of the retainer element 74. With this arrangement, the fingers 108, 110 are radially deflectable between a first state, shown in FIG. 4, and FIGS. 8 and 9, and a deflected state shown in FIG. 7. The sub-cavities 104, 106 are dimensioned to allow the fingers 108, 110 to deflect sufficiently radially so that the nut 56 can pass fully into the cavity 92. The fingers 108, 110 have notches 114, 116, corresponding to the notches 102, to accept the corners of the circumferential nut surface 96 at the juncture between the sides 76–86.

Each of the fingers 108 has the same construction, with a radially inwardly extending projection 118 having generally flat, axially inwardly and outwardly facing shoulders 120, 122, which are non-orthogonal to the axis 50 and make an acute angle with respect to each other. The fingers 110 each have a like projection 124, with radially inwardly and outwardly facing shoulders 126, 128.

To accommodate the projections 118, 124, the nut 56 has notches 130 formed at each corner of the circumferential surface 96, which notches 130 are bounded by radially inwardly facing, generally flat, shoulders 132 and radially outwardly facing, generally flat, shoulders 134. The corners between adjacent flat sides 76–86 are flattened, as shown at 136, between the axial outer side 138 of the nut 56 and the shoulder 132.

The number of notches 102, 114, 116 is selected so that the corners between adjacent sides 76–86 on the nut 56 can simultaneously key within the notches 102, 114, 116 and are numerous enough so that only a small angular adjustment is required between the retainer element 74 and nut 56 around the axis 50 to effect keying therebetween regardless of the relationship between the nut 565 and retainer element 74.

To effect placement of the retainer element 74 in the operative position, the retainer element 74 is aligned in the pre-assembly position shown in FIG. 6 with the major axis 140 (FIG. 2) for the elliptical shape of the body 90 bisecting the width of the crank handle 52. As the nut 56 moves into the cavity 92, the shoulders 120, 126 on the fingers 108, 110 encounter a beveled edge 142 on the nut 56 and cam progressively radially outwardly as the retainer element 74 is moved toward the operative position of FIG. 8. The projections 118, 124, in the deflected position of FIG. 7, ride along the corners over the flattened portions thereof at 136 until they axially coincide with the notches 130 in the nut 56, which notches 130 have a complementary shape to the projections 118, 124. With the retainer element 74 in the operative position of FIG. 8, the projections 118, 124 spring back to the first state therefor in which the shoulders 122 on the fingers 108 and shoulders 128 on the fingers 110 facially abut to the shoulders 132 on the nut 56 to prevent axial movement of the retainer element 74 outwardly from the operative position of FIG. 8. Preferably, the notches 130 and projections 118, 124 are relatively situated so that a flat, axially inwardly surface 144 on the body 90 of the retainer element 74 abuts to a flat, outwardly facing surface 146 on the crank handle 52 simultaneously as the projections 118, 124 seat in the notches 130.

To prevent relative rotation between the retainer element 74 and crank handle 52, posts 148, 150 are formed on the body 90 of the retainer element 74 and project axially in cantilever fashion therefrom at diametrically opposite locations along the major axis 140.

In a conventional crank handle construction, a threaded bore 152 is formed through the crank handle to accommodate the screw 36 (see FIG. 1). The post 148 is dimensioned to slide axially and fit snugly within the threaded bore 152. This arrangement facilitates retrofitting of the retainer element 74 to the conventional crank handle by simply providing the inventive nut 56 in place of the conventional, unnotched nut 26.

For additional rigidity, an optional second bore 154 can be provided to accommodate the optional post 150.

It is possible with the above construction to form the entire retainer element 74, including the body 90, fingers 108, 110, and posts 148, 150 as one piece in a plastic molding operation.

The retainer element 74 can be simply press fit/snap fit into its operative position without the use of separate fasteners. The retainer element 74 can be aligned in a pre-assembly position, press fit into place and slightly rotated relative to the nut 56 to align the posts 148, 150 with the bores 152, 154.

The foregoing disclosure of specific embodiments is intended to be illustrative of the broad concepts comprehended by the invention.

We claim:

1. A crank assembly for a fishing reel, said crank assembly comprising:

a first element that is capable of being driven in rotation to effect operation of a fishing reel;

a crank handle for imparting a rotational drive force to the first element;

a securing element that is repositionable relative to the crank handle and first element between a first position and a second position, said crank handle being mountable to and separable from the first element with the securing element in the first position, the securing element maintaining the crank handle mounted to the first element with the securing element in the second position for rotation with the first element; and a retainer element that is capable of being press fit into and maintained in an operative position relative to the crank handle and first element wherein the retainer element prevents the securing element from moving from the second position into the first position, wherein the securing element is rotatable around a first axis, the securing element has a first shoulder facing in a first axial direction relative to the first axis and the retainer element has a second shoulder facing oppositely to the first axial direction and with the retainer element in the operative position the first and second shoulders interact to prevent the retainer element from moving from the operative position.

2. The crank assembly according to claim 1 wherein the securing element comprises a nut that is threadably connected to the first element and rotatable around the first axis relative to the first element between the first and second positions.

3. The crank assembly according to claim 1 wherein the retainer element has a first repositionable finger with the second shoulder thereon, the repositionable finger abutting to the securing element as the retainer element is moved generally parallel to the first axis from a pre-assembly position into the operative position, there being surfaces on the first repositionable finger and securing element which cooperate to deflect the first repositionable finger radially relative to the first axis from a first state to a deflected state to allow the second shoulder to move axially up to and past the first shoulder as the retainer element moves from the pre-assembly position into the operative position whereupon the first repositionable finger moves back toward the first state so that the first and second shoulders face each other and interact to prevent the retainer element from moving from the operative position into the pre-assembly position.

4. The crank assembly according to claim 3 wherein the securing element comprises a nut that is threadably connected to the first element and rotatable around the first axis relative to the first element between the first and second positions.

5. The crank assembly according to claim 4 wherein the retainer element has a first cantilevered post extending generally parallel to the first axis, the first cantilevered post extending into the crank handle to prevent the retainer element from rotating relative to the crank handle around the first axis with the retainer element in the operative position.

6. The crank assembly according to claim 5 wherein the crank handle has a threaded bore and the first cantilevered post is capable of being extended into the threaded bore by translating the retainer element generally parallel to the first axis.

7. The crank assembly according to claim 5 wherein the first cantilevered post the finger are formed together as one piece.

8. The crank assembly according to claim 7 wherein the nut has a third shoulder facing in the first axial direction and the retainer element has a second repositionable finger with a fourth shoulder facing oppositely to the first axial direction and the second repositionable finger cooperates with the nut in the same manner as the first repositionable finger cooperates with the nut as the retainer element is moved from the pre-assembly position into the operative position so that the third and fourth shoulders face each other and interact to prevent the retainer element from moving from the operative position into the pre-assembly position.

9. The crank assembly according to claim 5 wherein the retainer element has a second cantilevered post extending generally parallel to the first axis and extending into the crank handle to prevent the retainer element from rotating relative to the crank handle around the first axis with the retainer element in the operative position.

10. The crank assembly according to claim 4 wherein the nut has a radially extending notch formed therein which defines the first shoulder.

11. The crank assembly according to claim 3 wherein the securing element has a third shoulder facing in the first axial direction and the retainer element has a second repositionable finger with a fourth shoulder facing oppositely to the first axial direction and the second repositionable finger cooperates with the securing element in the same manner as the first repositionable finger cooperates with the securing element as the retainer element is moved from the pre-assembly position into the operative position so that the third and fourth shoulders face each other and interact to prevent the retainer element from moving from the operative position into the pre-assembly position.

12. The crank assembly according to claim 11 wherein the first and third shoulders are diametrically opposite relative to the first axis.

13. The crank assembly according to claim 1 wherein the retainer element comprises a molded plastic piece.

14. The crank assembly according to claim 1 wherein the first element comprises an elongate shaft that is rotatable to impart rotation to a line carrying spool on a fishing reel.

15. The crank assembly according to claim 1 wherein the crank handle comprises a crank knob which is graspable by a user to facilitate rotation of the crank handle.

16. The crank assembly according to claim 1 wherein the retainer element in the operative position is keyed to both the securing element and the crank handle.

17. A fishing reel comprising:

a frame;

an operating mechanism on the frame, the operating mechanism including a shaft that is rotatable around a first axis;

a crank handle for imparting rotation to the shaft;

a nut that is threadably engaged with the shaft and repositionable between first and second positions relative to the crank handle and shaft, the crank handle being mountable to and separable from the shaft with the nut in the first position, the nut maintaining the crank handle mounted to the shaft with the nut in the second position for rotation with the shaft; and a retainer element that is press fit into and maintained in an operative position relative to the crank handle and shaft wherein the retainer element prevents the nut from moving from the second position into the first position, wherein the nut has a first shoulder facing in a first axial direction relative to the first axis and the retainer element has a second shoulder facing oppositely to the first axial direction, and with the retainer element in the operative position the first and second shoulders interact to prevent the retainer element from moving from the operative position.

18. The fishing reel according to claim 17 wherein the retainer element has a first repositionable finger with the second shoulder thereon, the repositionable finger abutting to the nut as the retainer element is moved generally parallel to the first axis from a pre-assembly position into the operative position, there being surfaces on the first repositionable finger and nut which cooperate to deflect the first repositionable finger radially relative to the first axis from a first state to a deflected state to allow the second shoulder to move axially up to and past the first shoulder as the retainer element moves from the pre-assembly position into the operative position whereupon the first repositionable finger moves back toward the first state wherein the first and second shoulders face each other and interact to prevent the retainer element from moving from the operative position into the pre-assembly position.

19. The crank assembly according to claim 18 wherein the retainer element has a first cantilevered post extending generally parallel to the first axis, the first cantilevered post extending into the crank handle to prevent the retainer element from rotating relative to the crank handle around the first axis with the retainer element in the operative position.

20. The crank assembly according to claim 19 wherein the crank handle has a threaded bore and the first cantilevered post is capable of being extended into the threaded bore by translating the retainer element generally parallel to the first axis.

21. The crank assembly according to claim 20 wherein the first cantilevered post and finger are formed together as one piece.

22. The crank assembly according to claim 17 wherein the retainer element in the operative position is keyed to both the nut and the crank handle.

23. A crank assembly for a fishing reel, said crank assembly comprising:

a first element that is capable of being driven in rotation around a first axis to effect operation of a fishing reel;

a crank handle for imparting a rotational drive force to the first element and having a threaded bore with a second axis that is parallel to the first axis and spaced from the first axis;

a securing element that is repositionable relative to the crank handle and first element between a first position and a second position, said crank handle being mountable to and separable from the first element with the securing element in the first position, the securing element maintaining the crank handle mounted to the first element with the securing element in the second position; and a retainer element that is capable of being placed and maintained in an operative position relative to the crank handle and first element without the use of a separate fastener element wherein the retainer element prevents the securing element from moving from the second position into the first position, the retainer element having a cantilevered post that can be directed into the threaded bore by translational movement of the cantilevered post in a line parallel to the first axis.

* * * * *